(12) United States Patent
Glynn

(10) Patent No.: US 8,115,332 B2
(45) Date of Patent: Feb. 14, 2012

(54) SOLAR-INITIATED WIND POWER GENERATION SYSTEM

(75) Inventor: Kenneth P. Glynn, Flemington, NJ (US)

(73) Assignee: Kenergy Scientific, Inc., Flemington, NJ (US)

( * ) Notice: Subject to any disclaimer, the term of this patent is extended or adjusted under 35 U.S.C. 154(b) by 377 days.

(21) Appl. No.: 12/384,822

(22) Filed: Apr. 9, 2009

(65) Prior Publication Data
US 2010/0259051 A1   Oct. 14, 2010

(51) Int. Cl.
*F03D 9/00* (2006.01)

(52) U.S. Cl. .......................................... 290/55; 290/1 R

(58) Field of Classification Search .................. 290/1 R, 290/44, 55; 60/398; 415/2.1, 4.1, 4.4, 4.5; 416/132 B
See application file for complete search history.

(56) References Cited

U.S. PATENT DOCUMENTS

| | | | | |
|---|---|---|---|---|
| 4,016,725 A | * | 4/1977 | Fiss | 60/690 |
| 4,118,636 A | * | 10/1978 | Christian | 290/52 |
| 4,224,528 A | * | 9/1980 | Argo | 290/55 |
| 4,331,042 A | * | 5/1982 | Anderson | 74/572.1 |
| 4,433,544 A | * | 2/1984 | Wells et al. | 60/641.12 |
| 4,481,774 A | | 11/1984 | Snook | |
| 4,945,693 A | | 8/1990 | Cooley | |
| 5,300,817 A | * | 4/1994 | Baird | 290/55 |
| 5,381,048 A | * | 1/1995 | Baird | 290/55 |
| 5,555,877 A | | 9/1996 | Lockwood et al. | |
| 5,608,268 A | | 3/1997 | Senanayake | |
| 6,089,021 A | | 7/2000 | Senanayake | |
| 6,201,313 B1 | * | 3/2001 | Nakamats | 290/54 |
| 6,225,705 B1 | * | 5/2001 | Nakamats | 290/43 |
| 6,249,059 B1 | * | 6/2001 | Hosoda | 290/55 |
| 6,703,720 B1 | | 3/2004 | Ferraro | |
| 6,717,285 B2 | | 4/2004 | Ferraro | |
| 7,239,035 B2 | * | 7/2007 | Garces et al. | 290/43 |
| 7,481,057 B2 | * | 1/2009 | Patwardhan | 60/641.8 |
| 7,821,151 B2 | * | 10/2010 | Le et al. | 290/55 |
| 2010/0018205 A1 | * | 1/2010 | Chen | 60/641.8 |
| 2010/0200034 A1 | * | 8/2010 | Miller | 135/94 |

OTHER PUBLICATIONS

Apex Definition, Jun. 5, 2011, http://dictionary.reference.com.*

* cited by examiner

*Primary Examiner* — Quyen Leung
*Assistant Examiner* — Thomas Truong
(74) *Attorney, Agent, or Firm* — Kenneth P. Glynn, Esq.; Deirora M. Meagher, Esq.

(57) ABSTRACT

A solar-initiated wind power generation system includes: (a) at least one support member adapted to support, and being connected to and supporting, a solar canopy above ground level; (b) at least one wind-driven power turbine and generator connected to the at least one support member and to an apex of a solar canopy; (c) the solar canopy, having a periphery and an inner area wherein the inner area is at least partially elevated above the periphery to establish at least one apex with a venturi effect, the solar canopy being connected to the at least one support member, the solar canopy having a major portion being selected from the group consisting of translucent material, transparent material and combinations thereof, the at least one apex of the solar canopy being connected to the at least one wind-driven power turbine and generator.

18 Claims, 10 Drawing Sheets

121

TURBINE AND GENERATOR
- Single turbine and generator/one vortex
- Multiple turbines and generators/multiple vortexes
- Single turbine and generator/multiple vortexes with manifold system
- AC load use/grid use/combination

123

CANOPY SUPPORT MEMBER
- Vertical centered supports
- Internal supports
- External supports
- Angled supports
- Combinations

125

CANOPY
- Flexible – translucent/transparent
- Rigid – translucent/transparent
- Single canopy/single vortex
- Single canopy/multiple vortexes
- Multiple canopies/each with single vortex
- Multiple canopies/each with multiple vortexes
- Multiple canopies/some single vortex, some multiple vortexes

FIGURE 10

SOLAR-INITIATED WIND POWER GENERATION SYSTEM

BACKGROUND OF INVENTION a. Field of Invention

The invention relates generally to a solar-initiated wind power generation system that relies upon, captures and guides solar initiated upwardly flowing wind, utilizing a venturi effect, into a turbine power generator. This creates direct electric current that may be used as such, but the direct current is typically converted into alternating current with an appropriate inverter. Controllers and other ancillary solar and wind power components may be included, such as battery storage and/or back up diesel generators. However, an essential aspect of the invention is the use of a canopy through which the sunlight passes to heat surfaces below it and to then carry the upwardly flowing heated air to its apex and to the turbine to generate the power.

b. Description of Related Art

The following patents are representative of the field pertaining to the present invention:

U.S. Pat. No. 6,717,285 B2 and No. 6,703,720 B1 to Ferraro both describe a wind powered generating device which comprises a tube cluster, a collector assembly, and a turbine assembly. The collector assemblies utilize sails that can be rotated to direct wind down through an inlet tube to a central outlet tube. The central outlet tube is narrowed at a portion, and a turbine is mounted at this narrowed portion to take advantage of the Venturi effect that accelerates the air as it passes the turbine. This permits reliable and efficient operation in areas that were not formerly considered windy enough to be economically feasible for the deployment of wind powered generating devices. Alternative embodiments of the inventions include mechanisms for dealing with violent weather conditions, a first of which allows excess wind to bleed off beneath and between the sails, and a second which collapses and covers the sail with a protective sheath/sock.

U.S. Pat. No. 6,089,021 to Senanayake describes a power production plant and method. The power production plant includes a chimney, a conduit in the chimney, the conduit having an inlet and an outlet, and a solar energy collector having an outlet connected to the chimney characterizing by the solar collector output being connected to the inlet of the conduit, by a rotor in the said outlet, and by the conduit being offset from the central axis of the chimney. The provision of a conduit in the chimney allows the plant to be constructed in stages, and to permit power output before full completion of the plant.

U.S. Pat. No. 5,608,268 to Senanayake describes a solar chimney assembly including a chimney for receiving fluid from a solar heat collector, and a turbine driven by the fluid. The solar heat collector, which increases the moisture content and the temperature of the air flowing past the turbine, has an evaporative area and a non-evaporative area. The non-evaporative area acts as a heat absorbing area and has a first cover which inhibits evaporation of a heat-absorbing liquid retained therein. The evaporative area has a second cover connected to the chimney and arranged to contain vapor evaporating from a liquid in the evaporative area. The assembly is constructed to a transfer thermal energy from the liquid of the non-evaporative area to liquid of the evaporative area, for high efficiency operation.

U.S. Pat. No. 5,555,877 to Lockwood et al. decribes a cover for withstanding stormy weather and increasingly solar heating of a body of water that is disposed over the surface of the water. The cover is more transparent to visible radiation from the sun than to infrared radiation, and is anchored and sealed around its periphery aver the surface of the body of water. Means are provided for reducing the pressure between the bottom of the cover and the top of the water to subatmospheric, and for flooding the top surface of the cover with a layer of water, and draining the layer of water from the top of the cover.

U.S. Pat. No. 4,945,693 to Cooley describes a concentic dome energy generating building enclosure it makes possible the passive transfer of renewable energy from the wind and the sun into mechanical and/or electrical energy. This invention provides the means for moving thermal and/or pneumatic pressure differentials created by the action of ambient energy on the dome through a conduit between concentric dome walls and directing these air pressure differentials through turbine at the apex of the dome building enclosure causing the turbine to rotate thereby generating power which can be used to operate tools and equipment inside the building enclosure.

U.S. Pat. No. 4,481,774 to Snook describes a canopy extends over a canyon to provide air channel with a lower entrance inlet and an upper discharge outlet. Sunlight passes through the canopy to effect heating of the air in the channel and airflow toward the upper outlet. A wind turbine may be driven by the discharging airflow.

Notwithstanding the prior art, the present invention is neither taught nor rendered obvious thereby.

SUMMARY OF INVENTION

The present invention is directed to a solar-initiated wind power generation system comprises: (a) at least one support member adapted to support, and being connected to and supporting, a solar canopy above ground level; (b) at least one wind-driven power turbine and generator connected to the at least one support member and to an apex of a solar canopy; (c) the solar canopy, having a periphery and an inner area wherein the inner area is at least partially elevated above the periphery to establish at least one apex with a venturi effect, the solar canopy being connected to the at least one support member, the solar canopy having a major portion being selected from the group consisting of translucent material, transparent material and combinations thereof, the at least one apex of the solar canopy being connected to the at least one wind-driven power turbine and generator.

In some preferred embodiments of the present invention, the solar canopy is a flexible plastic canopy.

In some preferred embodiments of the present invention, the solar canopy is a rigid canopy selected from the group consisting of glass, glass fiber and plastic.

In some preferred embodiments of the present invention, the at least one wind-driven power turbine includes blades that rotate about a vertical axis.

In some preferred embodiments of the present invention, the at least one wind-driven power turbine includes a protective top element to inhibit rain entry.

In some preferred embodiments of the present invention, the at least one support member is a support column, such as a vertical column, having a hollow top section wherein the hollow top section includes at least one wind entry port and contains the at least one wind-driven power turbine within the hollow top section above the at least one wind entry port, and wherein the solar canopy at least one apex is connected to the support column adjacent and above the at least one wind entry port.

In some preferred embodiments of the present invention, there is a plurality of apexes and there is one turbine and generator and there is a manifold connected to the plurality of apexes and connected to the one turbine and generator.

In some preferred embodiments of the present invention, there is a plurality of apexes and there is one turbine and generator for, and connected to each of the plurality of apexes.

In some preferred embodiments of the present invention, the at least one wind-driven power turbine and generator includes blades that rotate about a non-vertical axis.

In yet other preferred embodiments of the present invention, a solar-initiated wind power generation system comprises: (a) at least one support member adapted to support, and being connected to and supporting, a solar canopy above ground level; (b) at least one wind-driven power turbine and generator connected to the at least one support member and to an apex of a solar canopy; (c) the solar canopy, having a periphery and an inner area wherein the inner area is at least partially elevated above the periphery to establish at least one apex with a venturi effect, the solar canopy being connected to the at least one support member, the solar canopy having a major portion being selected from the group consisting of translucent material, transparent material and combinations thereof, the at least one apex of the solar canopy being connected to the at least one winddriven power turbine and generator; and, (d) at least one converter connected to the generator to convert power from the generator to alternating current.

In some preferred embodiments of the present invention the solar canopy has a lower portion and an upper portion and the lower portion has a greater horizontally-measured area than the upper portion.

In some preferred embodiments of the present invention the solar canopy has a single apex and has a decreasing horizontally-measured area as a function of increasing height.

In some preferred embodiments of the present invention set forth in paragraph [00022] above, the solar canopy is a flexible plastic canopy.

In some preferred embodiments of the present invention set forth in paragraph [00022] above, the solar canopy is a rigid canopy selected from the group consisting of glass, glass fiber and plastic.

In some preferred embodiments of the present invention set forth in paragraph [00022] above, the at least one wind-driven power turbine includes blades that rotate about a vertical axis.

In some preferred embodiments of the present invention set forth in paragraph [00022] above, the at least one wind-driven power turbine includes a protective top element to inhibit rain entry.

In some preferred embodiments of the present invention set forth in paragraph [00022] above, the at least one support member is a support column, such as a vertical column, having a hollow top section wherein the hollow top section includes at least one wind entry port and contains the at least one wind-driven power turbine within the hollow top section above the at least one wind entry port, and wherein the solar canopy at least one apex is connected to the support column adjacent and above the at least one wind entry port.

In some preferred embodiments of the present invention set forth in paragraph [00022] above, there is a plurality of apexes and there is one turbine and generator and there is a manifold connected to the plurality of apexes and connected to the one turbine and generator.

In some preferred embodiments of the present invention set forth in paragraph [00022] above, there is a plurality of apexes and there is one turbine and generator for, and connected to each of the plurality of apexes.

In some preferred embodiments of the present invention set forth in paragraph [00022] above, the at least one wind-driven power turbine and generator includes blades that rotate about a non-vertical axis.

In some preferred embodiments of the present invention set forth in paragraph [00022] above, the system further includes a heat reflecting material located a predetermined distance below the periphery of the solar canopy.

In some preferred embodiments of the present invention the solar canopy has a lower portion and an upper portion and the lower portion has a greater horizontally-measured area than the upper portion.

In some preferred embodiments of the present invention the solar canopy has a single apex and has a decreasing horizontally-measured area as a function of increasing height.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE EMBODIMENTS

The present invention is a solar-initiated wind power generation system that relies upon the sun to create upwardly flowing air (wind) that is used to generate electricity. The present invention system captures and vortexes solar initiated upwardly flowing wind into a turbine and power generator.

This creates direct electric current (DC) that may be used as such, but is typically converted into alternating current (AC) with an appropriate inverter. Controllers and other conventional and/or ancillary solar and wind power components may be included, such as battery storage and/or back up diesel generators. An essential aspect of the invention is the use of a canopy or a plurality of canopies through which the sunlight passes to heat surfaces below the canopy(ies) and to then carry the upwardly flowing heated air to the canopy apex(es) and to the turbine(s) to generate the power. "Vortexing" and "vortex" as used herein refers to a increase in speed of the airflow based on decreased cross-sectional area of flow. Such movement may or may not include swirling effects. The increase in speed of a moving fluid by restricting its cross-sectional area is also referred to as a venturi effect.

The present invention may be created strictly as a functional structure or it may incorporate aesthetic and/or plural uses into particular designs. For example, functionally, they may also act as a rain umbrella, falling leaf, and other natural falling material shelter, or even as a storage area. The designs may utilize plural apexes, different sizes and different shapes. They could have any footprint desired-round, square, rectangle, oval polygon, combinations, irregular, or other shape. They could have varying heights, alternating heights, etc. The actual spread and height is only limited by the structural limitations of the various components.

Further, the present invention solar canopies can be placed on macadam, concrete, gravel, stone, sand, dirt, grass, patio block, wood or otherwise and may be placed in yards, around pools, on patios, in parking lots, or can be connected to other structures, such as buildings and malls, etc.

Figure 1:
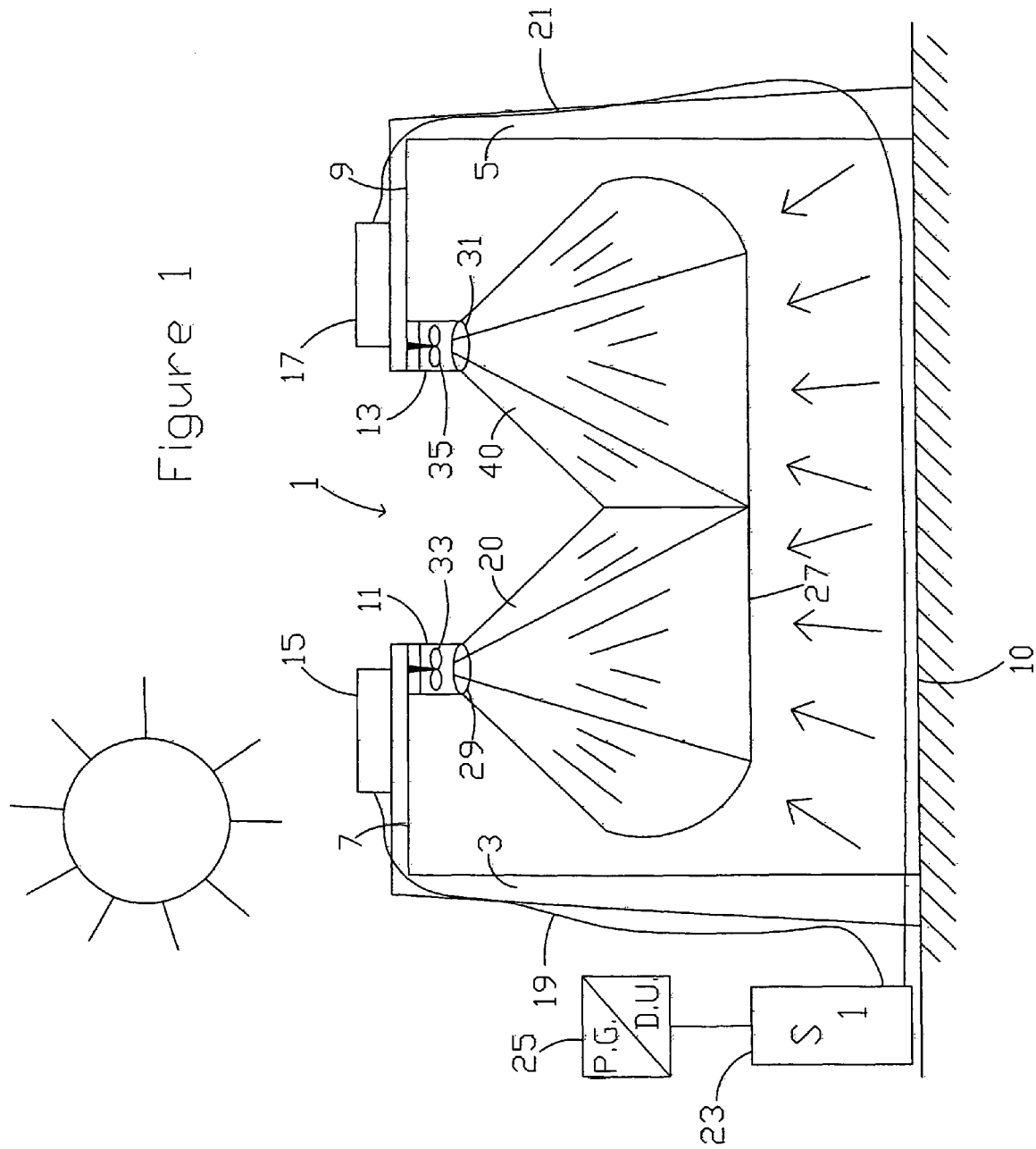
FIG. 1 is a front view of an embodiment of a present invention solar-initiated wind power generation system having a canopy with two apexes, each with its own turbine and generator.

FIG. 1 is a front view of an embodiment of a present invention solar-initiated wind power generation system 1, having two canopies 20 and 40 with apexes 29 and 31, respectively, each with its own turbine and generator. Apex 29 of the canopy 20 is connected to turbine housing that contains turbine 33, which is functionally connected to generator 15. Likewise, Apex 31 of canopy 40 is connected to turbine housing 13 that contains turbine 35, which is functionally connected to generator 17. Two canopy support members 3 and 5 are vertical posts with horizontal extensions 7 and 9, respectively. As shown, these support components described above so that canopies 20 and 40 are suspended and positioned above (not contacting) ground 10. Sunlight passes through the two connected canopies 20 and 40, heating ground 10, resulting in hot air rising. The hot air slowly rises at the base, but because the canopy cross-sections decrease with height, the speed of the hot air (rising solar wind) increases with increasing height.

Ground level solar thermals coming off concrete parking lots, roofs, macadam, stone or concrete roads, etc. have vertical rise rates of low speeds 3 to 5 mph to higher rates, e.g. 15 mph, depending upon ambient conditions ($\Delta T$, base temperature, winds, shears, temperature layers, fronts, etc.). Thus, ground level thermal updrafts under normal sunny conditions may be between 3 and 8 mph. However, in the present invention systems, the speed is accelerated due to the vortexing and the mathematical relationship between the base wind speed and the apex wind speed is the ratio of the base area (area at the bottom of the canopy) to the apex area:

$$S_a = S_b(A_b/A_a)$$

where $S_a$ is the apex wind speed, $S_b$ is the base or bottom wind speed, $A_a$ is the apex horizontal cross-sectional area and $A_b$ is the bottom horizontal cross-sectional area.

For canopies that are circular, the areas are equal to $\pi$ times the radius squared. Thus, for circular canopies, the updraft speed at the apex is $$S_a = S_b((r_b)^2/(r_a)^2)$$

where $r_a$ and $r_b$ are the apex and base radius.

Once the apex wind speed is determined or calculated and the diameter of the turbine blades is known, the amount of energy produced can then be determined by theoretical formulas. However, commercially available energy production information is readily available for microturbines and turbines at various average wind speeds. These turbines operated to produce the power whether their axis of rotation is positioned horizontally (as in typical wind turbine installations) or vertically (as in the present invention). Within ranges of variances (efficiencies), the power generated is based on the wind speed and the turbine blade span (sometimes referred to as the turbine diameter).

If a present invention single canopy is set up in a warm region where sun is plentiful and hot, such as Kenya, the Philippines, Barbados, or Ecuador, significant power can be generated with relatively small size present invention solar-initiated wind power generation systems. In temperate environments, larger systems are needed to generate the same power (shorter daylight, smaller $\Delta Ts$).

A canopy having a 40 ft diameter (20 ft radius) base and an apex with a 10 ft diameter and a 10 ft turbine blade span, has a ratio of apex speed to base speed of $(20)^2/(5)^2=16$. Thus, theoretically, a system with an average base updraft over an eight hour exposure of 4 mph will yield an apex speed of 48 mph. Since it is operating only ⅓ of each 24-hour day on average, the average wind speed at the apex is ⅓ of 48 mph or 16 mph. A 10 ft diameter microturbine can produce 4,000 kWh at approximately 16 mph average daily wind speed, according to published tables and known formulas. Thus, a present invention solar canopy having a 40 to 60 degree angled conical canopy with a base diameter of about 40 feet and an apex outlet of 10 feet with a ten foot diameter turbine, could produce about 4,000 kWh, enough power to satisfy the electric needs of a home in a developing country. Results would be expected to progress greater than linearly (almost geometrically) for increasingly larger systems.

Figure 2:
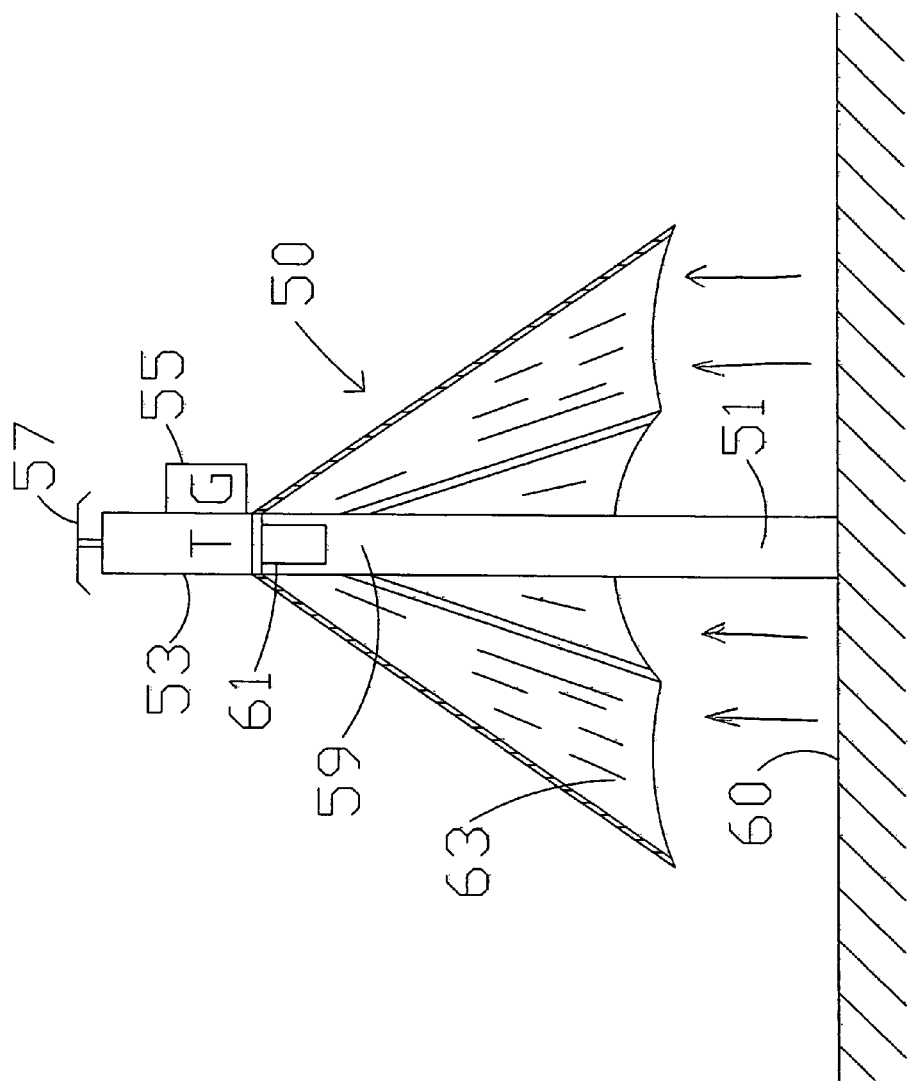
FIG. 2 is a partially cut front view of an embodiment of a present invention solar-initiated wind power generation system having a canopy with a single apex and with the turbine located inside the hollow top area of the canopy support member.

FIG. 2 is a partially cut front view of an embodiment of a present invention solar-initiated wind power generation system 50 having a canopy 63 with a single apex and with the turbine T located inside the hollow top area 53 of the canopy support member 51. The ground surface 60 may be macadam, concrete, wood, metal, rock, dirt, sand, grass, other material or combinations thereof The sunlight passes through clear canopy 63 (or at the edges of the canopy where sometimes the sunlight passes under the canopy) and heats up ground surface 60. The heated air rises into canopy 63 toward apex and into inlet 61, through turbine T and out vent 57 to turn the turbine T, which translates its rotational forces into generator G in housing 55 to generate electricity. Vent 57 has turned down edges, as shown in the figure, to inhibit rain entry. While in this example, the surface is referred to as ground surface 60, this could be a rooftop, an elevated constructed item, such as a deck, patio or porch, or it could be on a platform. The ground surface 60 is shown as flat, but it could be curved, rocky, mountainside or hillside or otherwise. Further, canopy 63 could be rigid clear plastic, flexible plastic sheet, glass, other light transmitting material, or combinations. The canopy may be polygonal, circular, oval or any other shape(s). The arrangements of the present invention such as shown in FIG. 2, with vents, prevent rain entry and thus may function as a protective umbrella, e.g. poolside or parking area.

Figure 3:
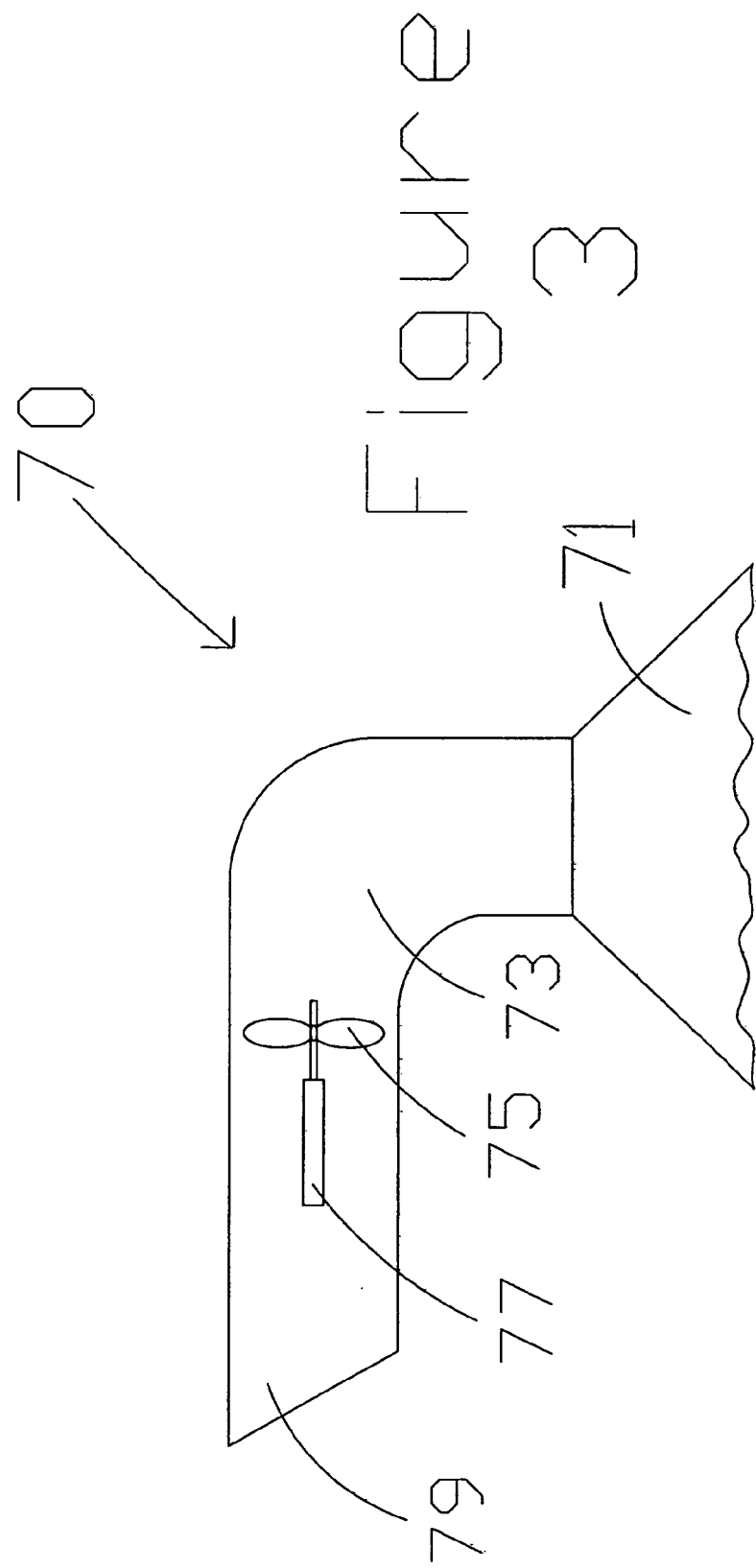
FIG. 3 is a partial cut side view of the embodiment of turbine and generator and solar chimney arrangement of a present invention solar-initiated wind power generation system.

FIG. 3 is a partial cut side view of the embodiment of turbine and generator and solar chimney arrangement of a present invention solar-initiated wind power generation system 70. There is a solar canopy 71 that operates in the same manner as those described above—allow sunlight to pass in and heat up a base, then receive upflowing air (solar wind) and concentrate it toward an apex and feed it to a power-producing turbine with generator. Here, the canopy 71 terminates in a dogleg pipe 73 to direct the air from vertical to horizontal direction to operate turbine 75 and generator 77 to produce power. The solar wind then exits through horizontal exit part 79. This top arrangement with the horizontal pipe prevents rain from entering the canopy and thus, enables the canopy to be used as a stationary umbrella when rainy weather occurs.

Figure 4:
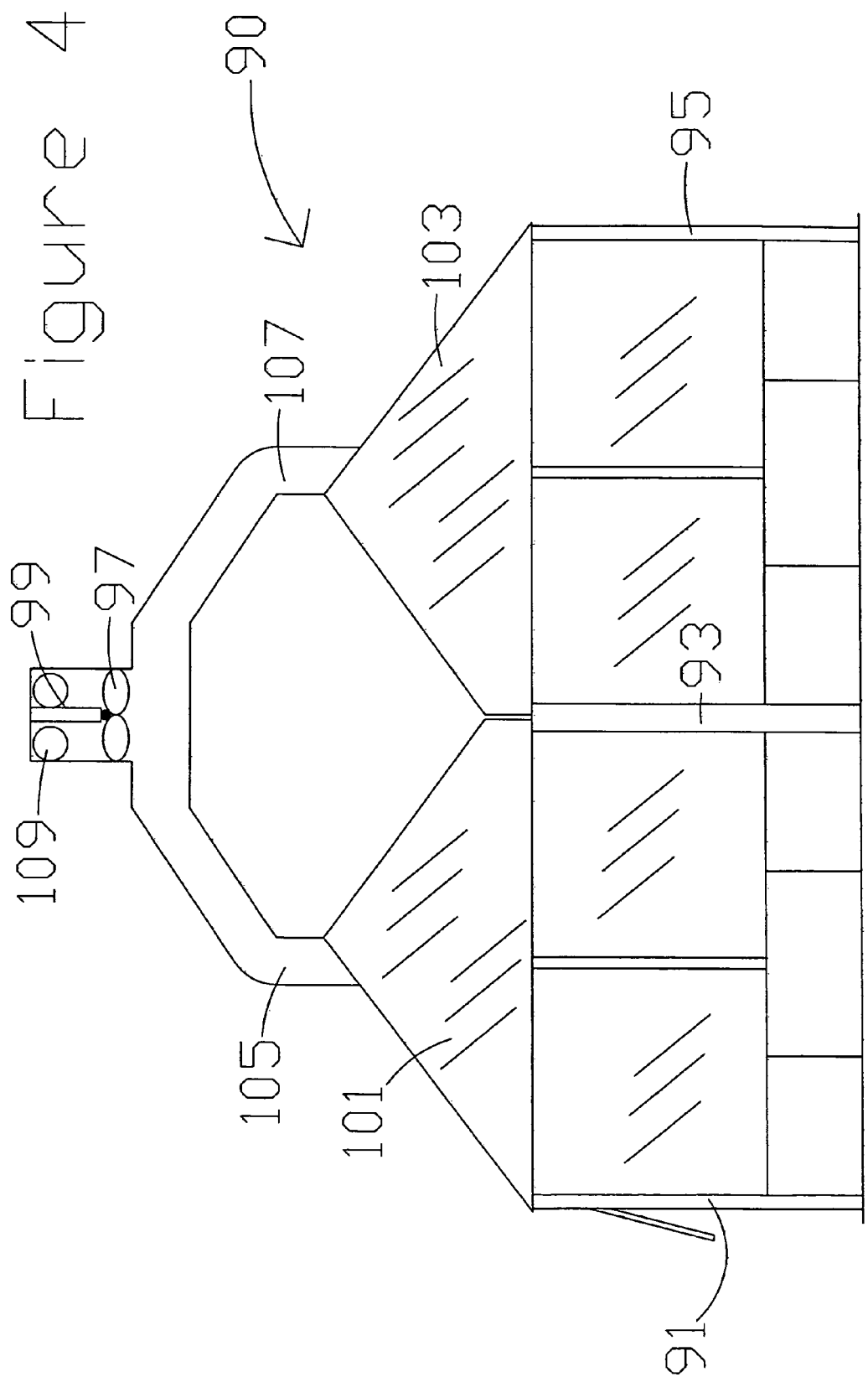
FIG. 4 is a front view of an embodiment of a present invention solar-initiated wind power generation system wherein the canopy is a plurality of greenhouse rigid glass roofs with two apexes that manifold into a single turbine and generator.

FIG. 4 is a front view of an embodiment of a present invention solar-initiated wind power generation system 90 wherein the canopy is a plurality of greenhouse rigid glass roofs 101 and 103, with two apexes (one apex each), that manifold into a single turbine 97 and generator 99. The greenhouse has glass walls 91, 93 and 95 and glass canopy roofs, that permit entry sunlight. As with all greenhouses, there are side windows that may be opened to allow incoming airflow. In this embodiment, the air inside the greenhouse is heated by the sunlight and the resulting rising air is sped up by the venture effect and moves rapidly into manifold pipes 105 and 107 that meet below turbine 97. The rising hot air turns turbine 97, driving generator 99 to produce electricity. The rising air exits via side vents 109.

Figure 5:
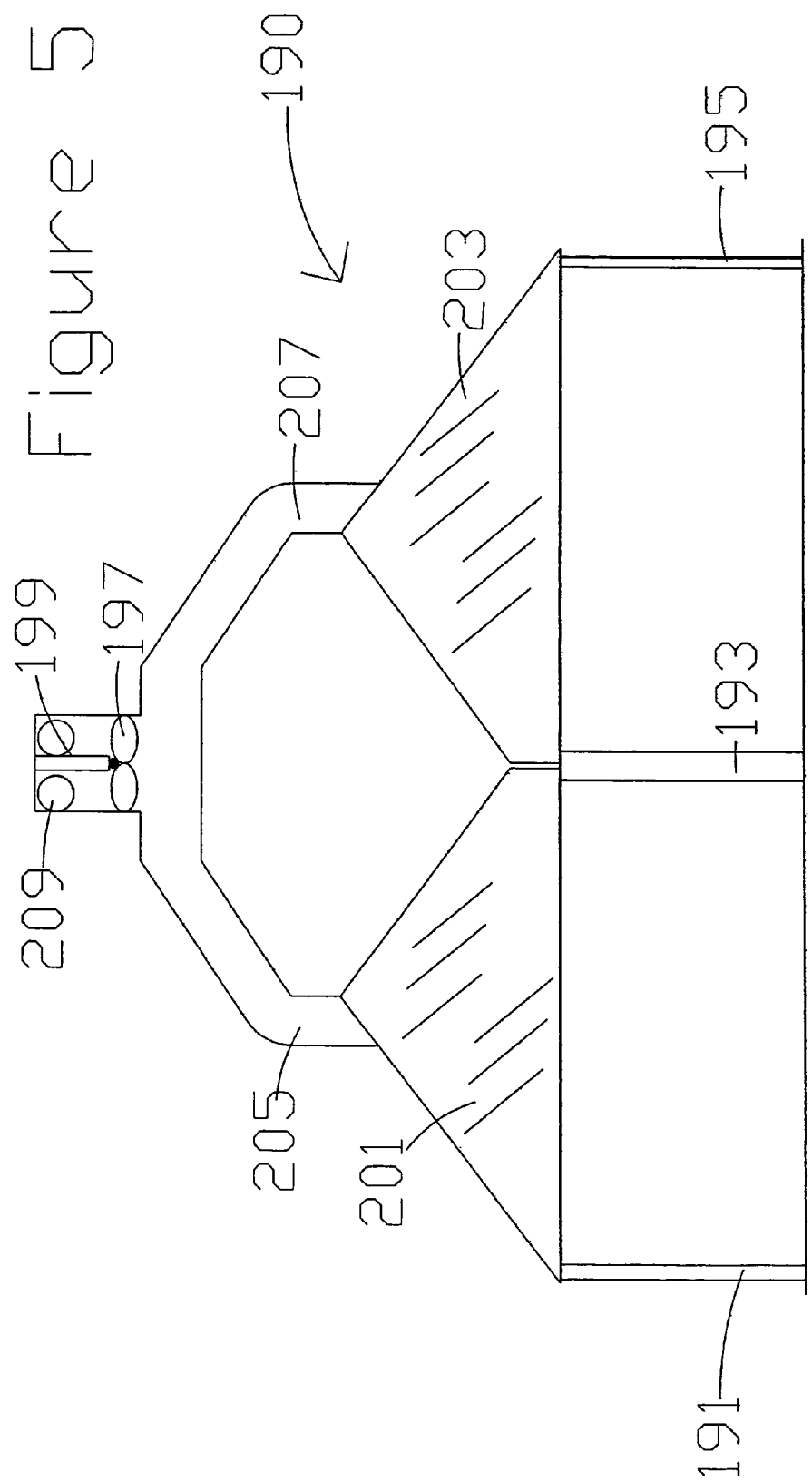
FIG. 5 is a front view of an embodiment of a present invention solar-initiated wind power generation system wherein the canopy is a plurality of tent-like flexible clear plastic roofs with two apexes that manifold into a single turbine and generator; and, FIGS. 6, 7, 8, 9 and 10 illustrate block diagrammatic representations of various embodiments of the present invention solar-initiated wind power generation system.

FIG. 5 is a front view of an embodiment of a present invention solar-initiated wind power generation system wherein the canopy is a plurality of tent-like flexible clear plastic roofs with two apexes that manifold into a single turbine and generator. Structurally, it appears to be similar to the greenhouse of FIG. 5, except that the roof is flexible plastic instead of glass or rigid plastic, and there are open walls. Thus, in FIG. 5 there is shown a front view of an embodiment of a present invention solar-initiated wind power generation system 190 wherein the canopy is a plurality of flexible clear plastic roofs 201 and 203 that permit entry sunlight, each with its own apex. These apexes manifold into a single turbine 197 and generator 199. The double-apex tent has open walls and support posts 191, 193 and 195. In this embodiment, the air inside the tent is heated by the sunlight and rises. The resulting rising air is sped up by the venture effect and moves rapidly into manifold pipes 205 and 207 that meet below turbine 197. The rising hot air turns turbine 197, driving generator 199 to produce electricity. The rising air exits via side vents 209.

FIGS. 6, 7, 8, 9 and 10 illustrate block diagrammatic representations of various embodiments of the present invention solar-initiated wind power generation system.

Figure 6:
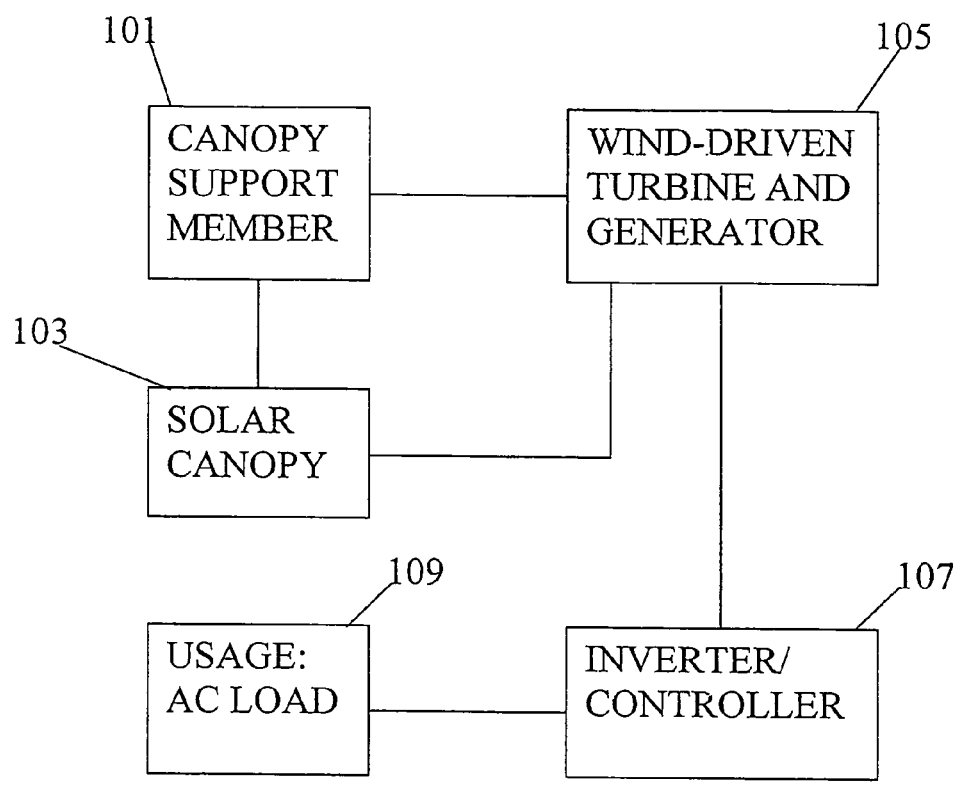

In the FIG. 6 block diagram, canopy support member 101 supports the solar canopy 103 and one or both of these, but typically the canopy support member 101, supports the wind turbine and generator 105 that is located at the apex of the canopy. The turbine blades are illustrated in preceding figures as horizontal (vertical axis) or as vertical (horizontal axis) but could be at any effective angle, depending upon the positioning and orientation of the outlet from the apex and the position of the turbine(s). The wind turbine and generator 105 produces direct current that passes through inverter/controller 107 to create alternating current. The alternating current goes to usage 109, which is typically an alternating current load. However, the alternating current could be fed back to the grid, where appropriate, for power credits or payments from the grid power company back to the user.

Figure 7:
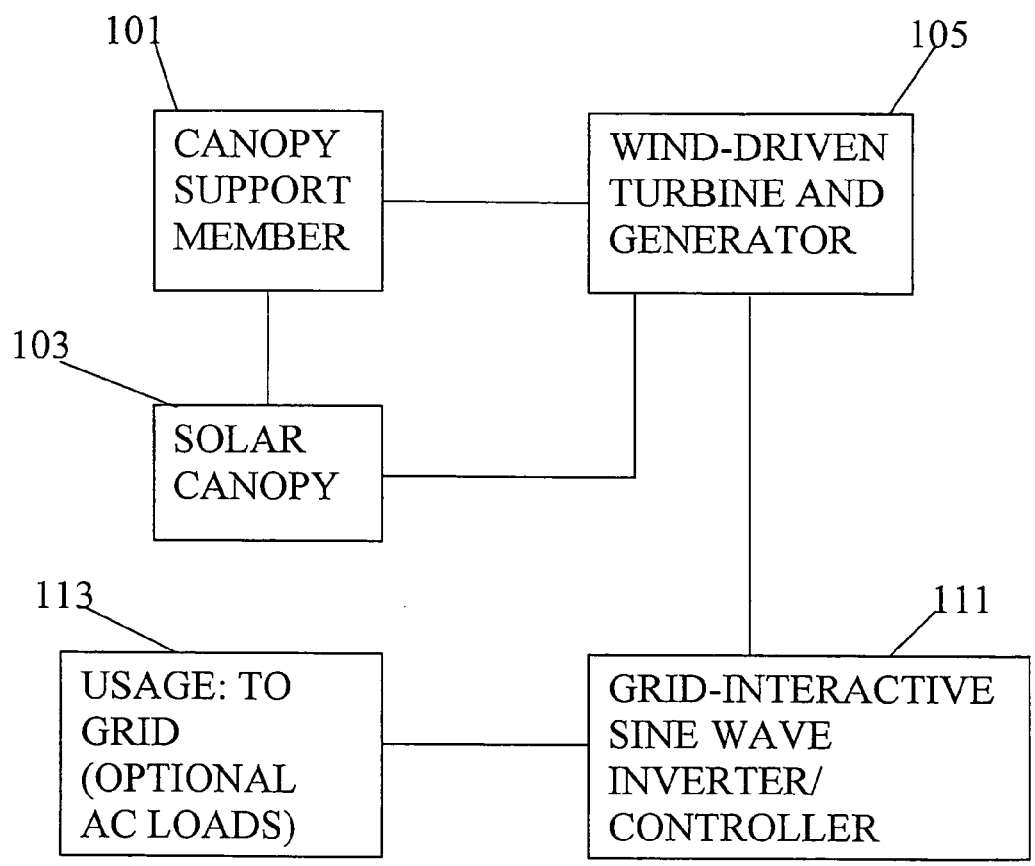

In FIG. 7, the blocks 101, 103 and 105 are the same as shown in FIG. 6 and function in the same manner, except that FIG. 7 shows details for a user connected to a power grid. Thus, inverter/controller 111 must be one that corrects for use on the grid, that is, a grid-interactive sine wave inverter/controller for correct feeding to grid 113.

Figure 8:
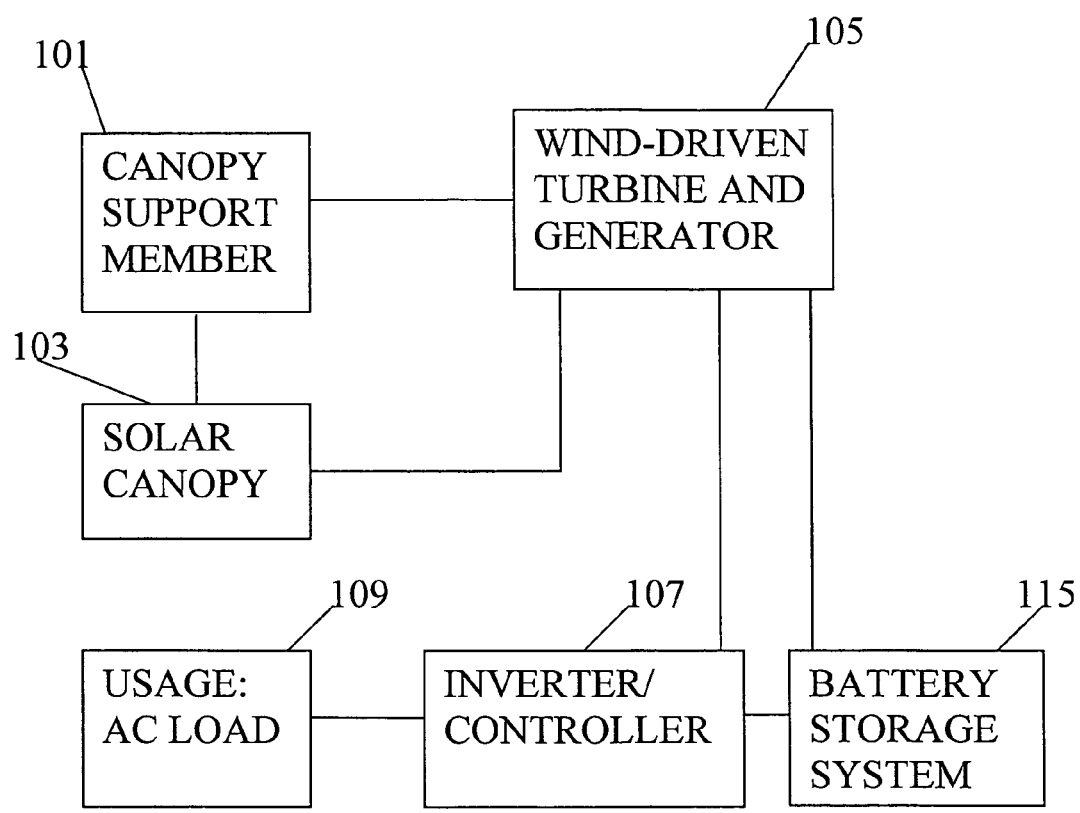

In FIG. 8, the blocks 101, 103, 105, 107 and 109 are the same as shown in FIG. 6 and function in the same manner. In this FIG. 8 embodiment, the direct current from generator 105 may be sent to a battery storage system 115 or directly to inverter/controller 107 for subsequent alternating current load usage 109. Battery storage system 115 can be used for drawing power through inverter/controller 107 for alternating current load usage 109.

Figure 9:
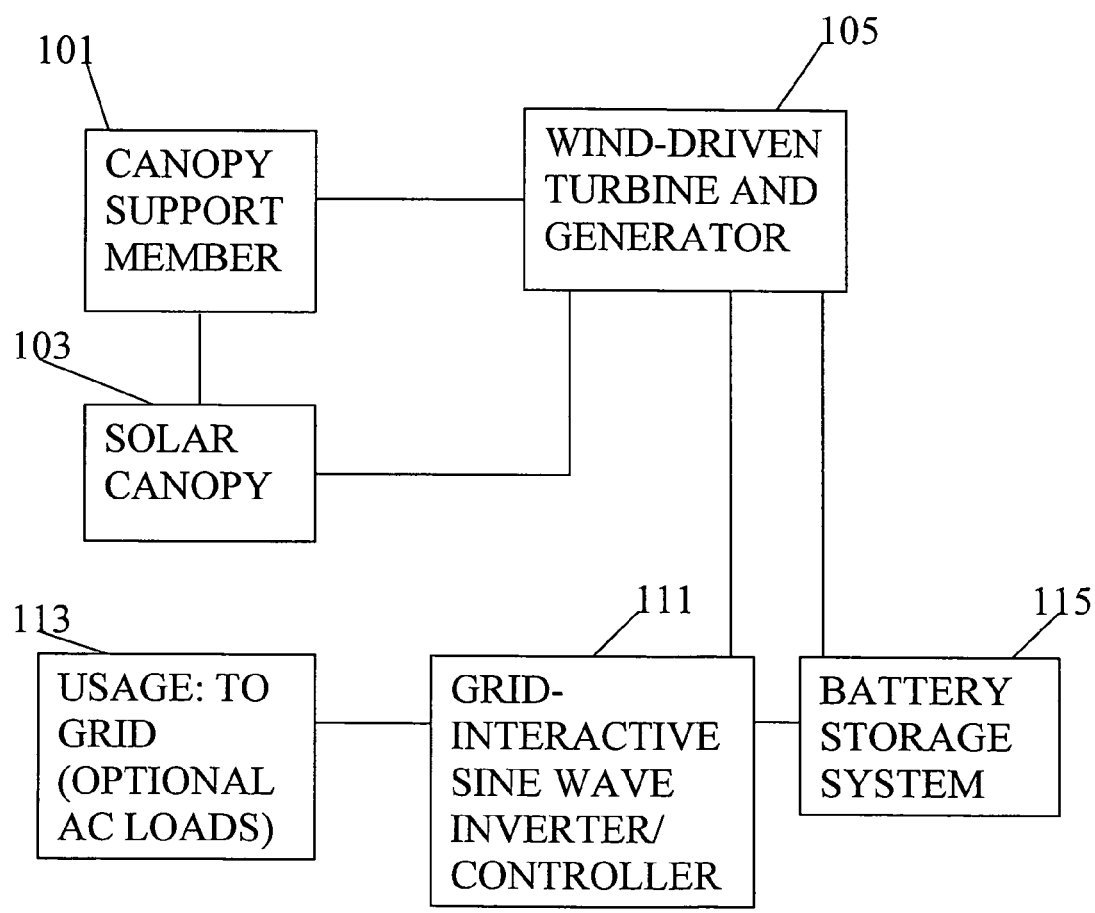

In FIG. 9, the blocks 101, 103 and 105 are the same as shown in FIG. 7 and function in the same manner. In this FIG. 9 embodiment, the direct current from generator 105 may be sent to a battery storage system 115 or directly to grid-interactive sine wave inverter/controller 107 for subsequent alternating current load usage 113. Battery storage system 115 can be used for drawing power through inverter/controller 111 for alternating current load usage 113.

FIG. 10 illustrates a block diagrammatic representation of various embodiment options of the present invention solar-initiated wind power generation system. Block 125 describes some preferred canopy options. These include flexible-translucent or transparent, rigid-translucent or transparent, single canopy/single vortex, single canopy/multiples vortexes, multiple canopies/each with single vortex, multiple canopies, each with multiple vortexes, and multiple canopies/some single vortex, some multiple vortexes. Block 123 illustrates various canopy support member options. These include vertical centered supports, internal supports, external supports, angled supports, and combinations. Block 121 describes turbine and generator options. These include single turbine and generator/one vortex, multiple turbines and generators/multiple vortexes, single turbine and generator/multiple vortexes with manifold system, and AC load use/grid use/combinations.

With reference to the accompanying drawings, it is to be understood that the invention is not limited to those particular embodiments, and that various changes and modifications may be effected therein by one skilled in the art without departing from the scope or spirit of the invention as defined herein and in the appended claims.

What is claimed is:

1. A solar-initiated wind power generation system, which comprises:
  a) at least one support member adapted to support, and being connected to and supporting a solar canopy by suspending said solar canopy above ground level, wherein said at least one support member is a support column having a hollow top section wherein said hollow top section includes at least one wind entry port and contains said at least one wind-driven power turbine within said hollow top section above said at least one wind entry port, and wherein said solar canopy at least one apex is connected to said support column adjacent and above said at least one wind entry port;
  b) at least one wind-driven power turbine and generator connected to said at least one support member and to an apex of said solar canopy;
  c) said solar canopy, having a periphery and an inner area wherein said inner area is at least partially elevated above said periphery to establish at least one apex with a venturi effect, said solar canopy being connected to and suspended from said at least one support member such that said periphery is above ground level and not in contact with said ground level, said solar canopy having a major portion being selected from the group consisting of translucent material, transparent material and combinations thereof, said at least one apex of said solar canopy being functionally connected to said at least one wind-driven power turbine and generator.

2. The solar-initiated wind power generation system of claim 1 wherein said solar canopy is a flexible plastic canopy.

3. The solar-initiated wind power generation system of claim 1 wherein said solar canopy is a rigid canopy selected from the group consisting of glass, glass fiber and plastic.

4. The solar-initiated wind power generation system of claim 1 wherein said at least one wind-driven power turbine includes blades that rotate about a vertical axis.

5. The solar-initiated wind power generation system of claim 1 wherein said at least one wind-driven power turbine includes a protective top element to inhibit rain entry.

6. The solar-initiated wind power generation system of claim 1 wherein there is a plurality of apexes and there is one turbine and generator for, and connected to, each of said plurality of apexes.

7. The solar-initiated wind power generation system of claim 1 wherein said at least one wind-driven power turbine and generator includes blades that rotate about a non-vertical axis.

8. The solar-initiated wind power generation system of claim 1 wherein said solar canopy has a lower portion and an upper portion and said lower portion has a greater horizontally-measured area than said upper portion.

9. The solar-initiated wind power generation system of claim 1 wherein said solar canopy has a single apex and has a decreasing horizontally-measured area as a function of increasing height.

10. A solar-initiated wind power generation system, which comprises:
   a) at least one support member adapted to support, and being connected to and supporting, a solar canopy above ground level, wherein said at least one support member is a support column having a hollow top section wherein said hollow top section includes at least one wind entry port and contains said at least one wind-driven power turbine within said hollow top section above said at least one wind entry port, and wherein said solar canopy at least one apex is connected to said support column adjacent and above said at least one wind entry port;
   b) at least one wind-driven power turbine and generator connected to said at least one support member and to an apex of said solar canopy;
   c) said solar canopy, having a periphery and an inner area wherein said inner area is at least partially elevated above said periphery to establish at least one apex with a venturi effect, said solar canopy being connected to said at least one support member, said solar canopy having a major portion being selected from the group consisting of translucent material, transparent material and combinations thereof, said at least one apex of said solar canopy being connected to said at least one wind-driven power turbine and generator; and,
   d) at least one inverter connected to said generator to convert direct current electric power from said generator to alternating current electric power.

11. The solar-initiated wind power generation system of claim 10 wherein said solar canopy is a flexible plastic canopy.

12. The solar-initiated wind power generation system of claim 10 wherein said solar canopy is a rigid canopy selected from the group consisting of glass, glass fiber and plastic.

13. The solar-initiated wind power generation system of claim 10 wherein said at least one wind-driven power turbine includes blades that rotate about a vertical axis.

14. The solar-initiated wind power generation system of claim 10 wherein said at least one wind-driven power turbine includes a protective top element to inhibit rain entry.

15. The solar-initiated wind power generation system of claim 10 wherein there is a plurality of apexes and there is one turbine and generator for, and connected to each of said plurality of apexes.

16. The solar-initiated wind power generation system of claim 10 wherein said at least one wind-driven power turbine and generator includes blades that rotate about a non-vertical axis.

17. The solar-initiated wind power generation system of claim 10 wherein said solar canopy has a lower portion and an upper portion and said lower portion has a greater horizontally-measured area than said upper portion.

18. The solar-initiated wind power generation system of claim 10 wherein said solar canopy has a single apex and has a decreasing horizontally-measured area as a function of increasing height.

* * * * *